US008253532B2

(12) United States Patent
Klein et al.

(10) Patent No.: US 8,253,532 B2
(45) Date of Patent: Aug. 28, 2012

(54) CONTROLLING DEVICE HAVING A DEVICE MODE STATE TOGGLE FEATURE

(75) Inventors: Sandro David Klein, Cypress, CA (US); Patrick H. Hayes, Mission Viejo, CA (US)

(73) Assignee: Universal Electronics Inc., Cypress, CA (US)

( * ) Notice: Subject to any disclaimer, the term of this patent is extended or adjusted under 35 U.S.C. 154(b) by 2678 days.

(21) Appl. No.: 10/694,582

(22) Filed: Oct. 27, 2003

(65) Prior Publication Data

US 2005/0088315 A1 Apr. 28, 2005

(51) Int. Cl.
*G05B 23/00* (2006.01)

(52) U.S. Cl. ........................................................ 340/5.61

(58) Field of Classification Search ............. 340/825.69, 340/825.72, 426.13, 176, 5.1, 4.11, 3.1; 348/14.05; 341/176; 367/117

See application file for complete search history.

(56) References Cited

U.S. PATENT DOCUMENTS

| | | | | |
|---|---|---|---|---|
| 4,623,887 | A | 11/1986 | Welles, II | |
| 4,959,810 | A | 9/1990 | Darbee et al. | |
| 5,255,313 | A | 10/1993 | Darbee | |
| 5,552,917 | A | 9/1996 | Darbee et al. | |
| 5,554,980 | A * | 9/1996 | Hashimoto et al. | 340/825.72 |
| 5,614,906 | A | 3/1997 | Hayes et al. | |
| 6,127,941 | A * | 10/2000 | Van Ryzin | 340/825.69 |
| 6,208,341 | B1 * | 3/2001 | van Ee et al. | 715/716 |
| 6,225,938 | B1 | 5/2001 | Hayes et al. | |
| 6,507,306 | B1 * | 1/2003 | Griesau et al. | 341/176 |
| 6,633,281 | B2 * | 10/2003 | Lin et al. | 345/173 |

OTHER PUBLICATIONS

PRIMESTAR, PrimeFinder Remote Control, User's Manual, 2 pages.

* cited by examiner

*Primary Examiner* — Vernal Brown

(74) *Attorney, Agent, or Firm* — Greenberg Traurig, LLP

(57) ABSTRACT

A controlling device having a feature for toggling between various device mode states. The device mode state toggle feature may be implemented as a key which is preferably located with the function keys thus being spaced from the top of the controlling device. The device mode state toggle feature may be used to sequentially toggle between all device mode states of the controlling device, to toggle between a currently selected device mode state and a previously selected device mode state of the controlling device, to toggle between device mode states that have been designated by a user of the controlling device, etc. An indicia, such as a LED, key illumination, color, sound, or the like, may be utilized to provide an indication to the user as to which device mode state the controlling device is placed into when the device mode state toggle feature is activated.

49 Claims, 10 Drawing Sheets

CONTROLLING DEVICE HAVING A DEVICE MODE STATE TOGGLE FEATURE

BACKGROUND

The following relates generally to controlling devices and, more particularly, to a controlling device having a device mode state toggle feature.

Manufacturers typically provide a remote control with an appliance and, as such, different appliance types of different manufacturers are often commanded with different remote controls. To minimize the number of individual remote controls a user requires, universal remote controls have been developed. Accordingly, universal remote controls for commanding various functions of various types of appliances of various manufacturers have become quite widespread. Universal remote controls of this type are described in commonly assigned U.S. Pat. Nos. 4,959,810, 5,255,313 and 5,552,917.

For commanding the operation of multiple appliances using a single universal remote control, a conventional universal remote control typically includes multiple device mode states. In each device mode state, the universal remote control is configured to command the operation of one or more designated appliances. Typically, the universal remote control is placed into one of the multiple device mode states through actuation of a corresponding device mode key. Thus, actuation of a device mode key functions to configure the universal remote control to transmit command codes to the one or more appliances that have been designated to the device mode state corresponding to the actuated device mode key.

By way of example, a simple three device universal remote control may include device mode selection keys labeled “TV,” “VCR,” and “CBL.” When the TV device mode key is actuated, the remote control may be placed into a “TV” device mode state wherein it is configured to transmit commands to a TV device in response to key activations, when the VCR device mode key is actuated the remote control may be placed into a “VCR” device mode state wherein it is configured to transmit commands to a VCR device in response to key activations, and so on. For the sake of user convenience each of these device mode states may, however, incorporate certain keys adapted to transmit commands to a device other than the primary device of that device mode state, e.g., the controlling device may be configured such that, when in the TV device mode state, the keys “Play,” “Stop,” and “Pause” may continue to transmit commands in a format appropriate for a given VCR device, when in a VCR device mode state, the volume control keys may continue to transmit commands in a format appropriate for a given Audio device, etc.

In currently available universal remote controls, the device mode keys are generally positioned in the vicinity of the top portion of the universal remote control, i.e., near the infrared (“IR”) transmitter. This positioning of the device mode keys does, however, suffer the disadvantage of being inconvenient for a user. Specifically, positioning the device mode keys in the vicinity of the top portion of the universal remote control requires a user to move their hand from the vicinity of the command keys to gain access to the device mode keys when it is desired to change the current device mode state of the universal remote control.

Still further, it is known to provide a universal remote control in which the various device mode states may be stepped through in sequence via actuation of a single button, or are presented as a selectable list under the control of one or more designated navigation keys. In such universal remote controls, individual LEDs or an LCD display allows the user to determine which device mode state the universal remote control is placed into when the single button is actuated. For example, in the Primestar “Primefinder RC1402” brand remote control a single key (labeled “Mode”) is provided for use in stepping through four possible device mode states: Primestar STB, TV, VCR and AUX. Four indicator LEDs positioned across the top of the unit indicate the currently selected device mode state. To switch device mode states the user presses the “Mode” key repetitively until the LED corresponding to the desired device mode state is illuminated. The interested reader may find a more detailed description of this process in Chapter 2 of the Primstar PrimeFinder Remote Control User’s Manual, document M4061 10/07.

SUMMARY

To address various disadvantages associated with the manner by which device mode states are attainable in currently available universal remote controls, the following discloses controlling devices that are provided with a device mode state toggle feature. Utilizing this feature, a controlling device may toggle between various device mode states, for example, through actuation of a device mode state toggle key. Advantageously, the device mode state toggle key may be located in the vicinity of the middle of the universal remote control, i.e., in a position amidst the command keys. Furthermore, the device state mode toggle may be used to sequentially toggle, i.e., cycle, between all device mode states of the controlling device, to toggle between a currently selected device mode state and a previously selected device mode state of the controlling device, to toggle between specific device mode states that have been designated by a user of the controlling device, to toggle between device mode states that have been setup within the controlling device, etc. Still further, an indicia, such as a key illumination, LED, color, sound, vibration, or the like, may be utilized in connection with the device mode state toggle to provide an indication to the user as to which device mode state the controlling device is currently in or is to be placed into when the device mode state toggle feature is actuated.

A better appreciation of the objects, advantages, features, properties, and relationships of the disclosed controlling devices will be obtained from the following detailed description and accompanying drawings which set forth illustrative embodiments which are indicative of the various ways in which the principles described hereinafter may be employed.

BRIEF DESCRIPTION OF THE DRAWINGS

For use in better understanding the exemplary controlling devices reference may be had to the following drawings in which.

DETAILED DESCRIPTION

For allowing a user of a controlling device 100 to quickly and conveniently place a controlling device, such as a universal remote control, into a desired device mode state, the following describes exemplary controlling devices 100 that have a device mode state toggle feature. Preferably, the device mode state toggle feature is activated in response to actuation of a device mode state toggle key. As will become apparent, the device mode state toggle feature may be implemented in controlling devices having one or more of hard keys, soft keys, electro-luminescent keys, or the like.

Figure 1:
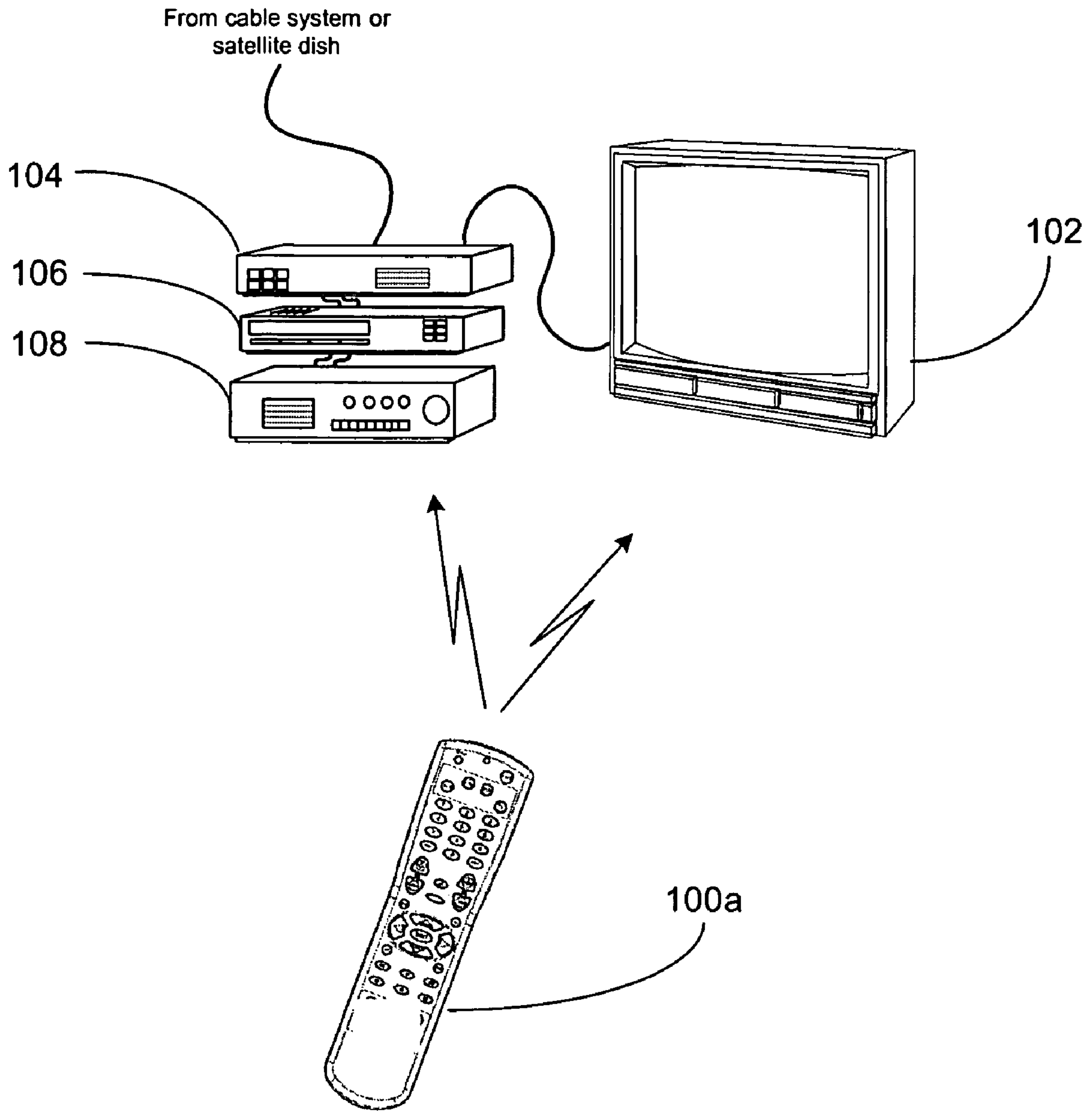
FIG. 1 illustrates an exemplary system in which the exemplary controlling devices may be utilized.

By way of example, FIG. 1 shows an exemplary system, including controllable appliances, such as a set top box ("STB") 104, a VCR 106, an audio amplifier/receiver 108 and a television 102, as well as a controlling device 100*a*. The controlling device 100*a* is capable of transmitting commands to the appliances, using any convenient IR, RF, Point-to-Point, or networked protocol, to cause the appliances to perform operational functions. While illustrated in the context of a STB 104, VCR 106, audio system 108 and television 102, it is to be understood that controllable appliances can include, but are not limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc.

Figure 2:
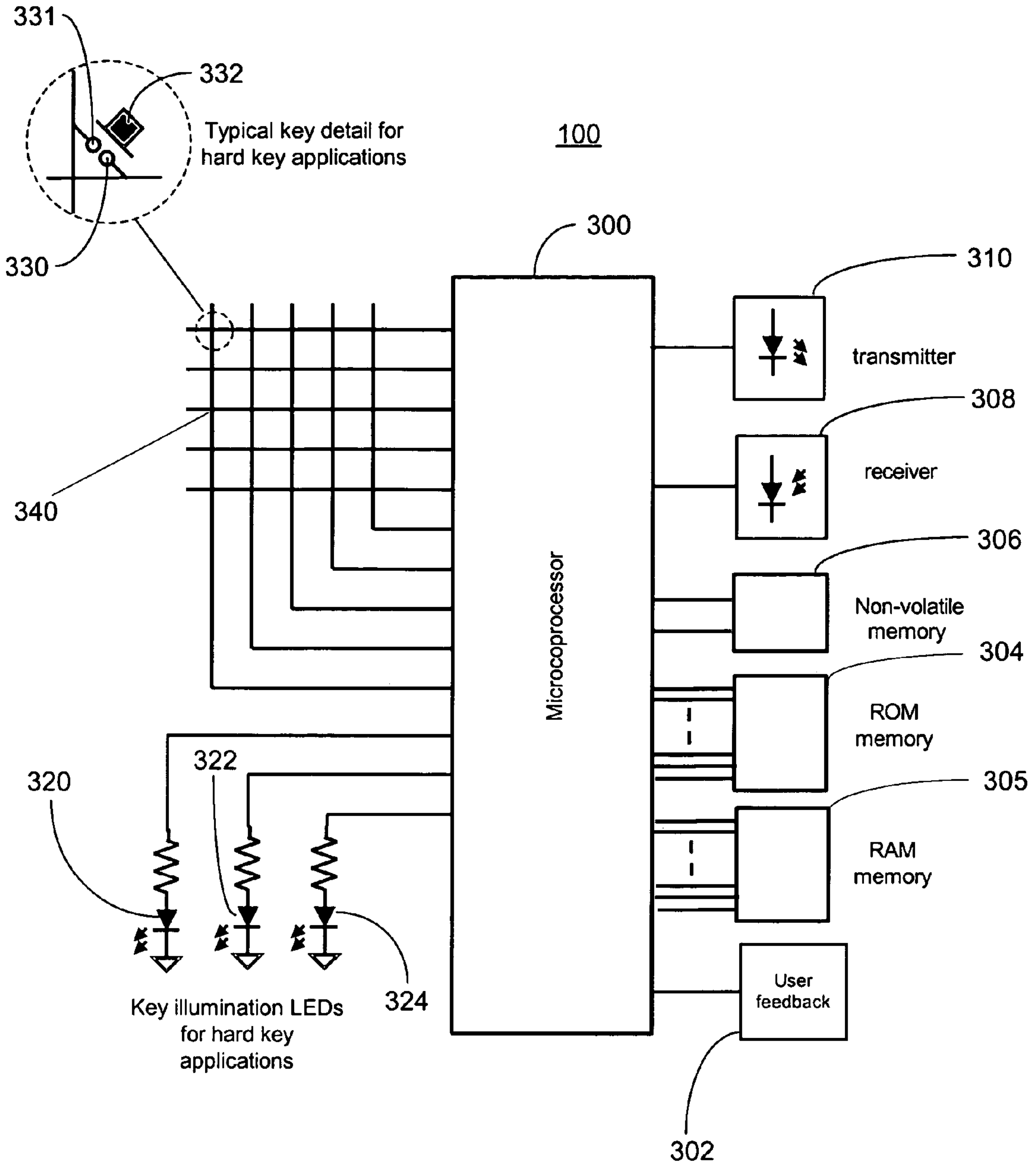
FIG. 2 illustrates a block diagram of exemplary components of the exemplary controlling devices.

For use in commanding the functional operations of one or more appliances, the controlling devices 100 may include, as needed for a particular application, a processor 300 coupled to a ROM memory 304, a RAM memory 305, a key matrix 340 (e.g., hard keys, soft keys such as a touch sensitive surface overlaid on a liquid crystal (LCD), and/or an electroluminescent (EL) display), transmission circuit(s) 310, receiver circuit(s) 308 and/or transceiver circuit(s) (e.g., IR and/or RF), a non-volatile read/write memory 306, a means 302 to provide feedback to the user (e.g., one or more LEDs, display, speaker, and/or the like), and key illumination means, as illustrated in FIG. 2. As will become apparent, the key illumination means may be in the form of separate elements, such as LEDs 320, 322, and 324 associated with a hard key matrix, or may be integrated as part of the key matrix, for example in the case where the key matrix is implemented using a touch screen display. In the case where the controlling device 100 includes hard keys, an exemplary molded-in key 332 is shown as operative with key matrix circuit 330, 331. The nature and function of keys 332 on the remote are described in greater detail below.

As will be understood by those skilled in the art, some or all of the memories 304, 305, 306 may include executable instructions (collectively, the program memory) that are intended to be executed by the processor 300 to control the operation of the remote control 100. In this manner, the processor 300 may be programmed to control the various electronic components within the remote control 100, e.g., to monitor the power supply (not shown), to cause the transmission of signals, control the key illumination means 320, 322, and 324, etc. The non-volatile read/write memory 306, for example an EEPROM, battery-backed up RAM, Smart Card, memory stick, or the like, may additionally be provided to store setup data and parameters as necessary. While the memory 304 is illustrated and described as a ROM memory, memory 304 can also be comprised of any type of readable media, such as ROM, FLASH, EEPROM, or the like. Preferably, the memory 304 is non-volatile or battery-backed such that data is not required to be reloaded after battery changes. In addition, the memories 304, 305 and 306 may take the form of a chip, a hard disk, a magnetic disk, an optical disk, and/or the like. Still further, it will be appreciated that some or all of the illustrated memory devices may be physically incorporated within the same IC chip as the microprocessor 300 (a so called "microcontroller") and, as such, they are shown separately in FIG. 2 only for the sake of clarity.

To cause the controlling device 100 to perform an action, the controlling device 100 is adapted to be responsive to events, such as a sensed user interaction with the key matrix 340, receipt of a transmission via receiver 308, etc. In response to an event, appropriate instructions within the program memory may be executed. For example, when a function command key is actuated on the controlling device 100, the controlling device 100 may retrieve a command code corresponding to the actuated function command key, in the current device mode, from memory 304, 305, 306 and transmit the command code to an intended target appliance, e.g., STB 104, in a format recognizable by that appliance. It will be appreciated that the instructions within the program memory can be used not only to cause the transmission of command codes and/or data to the appliances, but also to perform local operations. While not limiting, local operations that may be performed by the controlling device 100 may include displaying information/data, favorite channel setup, macro key setup, function key relocation, etc. Examples of local operations can be found in U.S. Pat. Nos. 5,481,256, 5,959,751, and 6,014,092. An additional local operation is the ability to "lock" function keys across device operational modes as described in U.S. Published Patent Application No. 2003/0025840. A still further local operation, described hereinafter, is the ability to setup the device mode state toggle feature.

Figure 3:
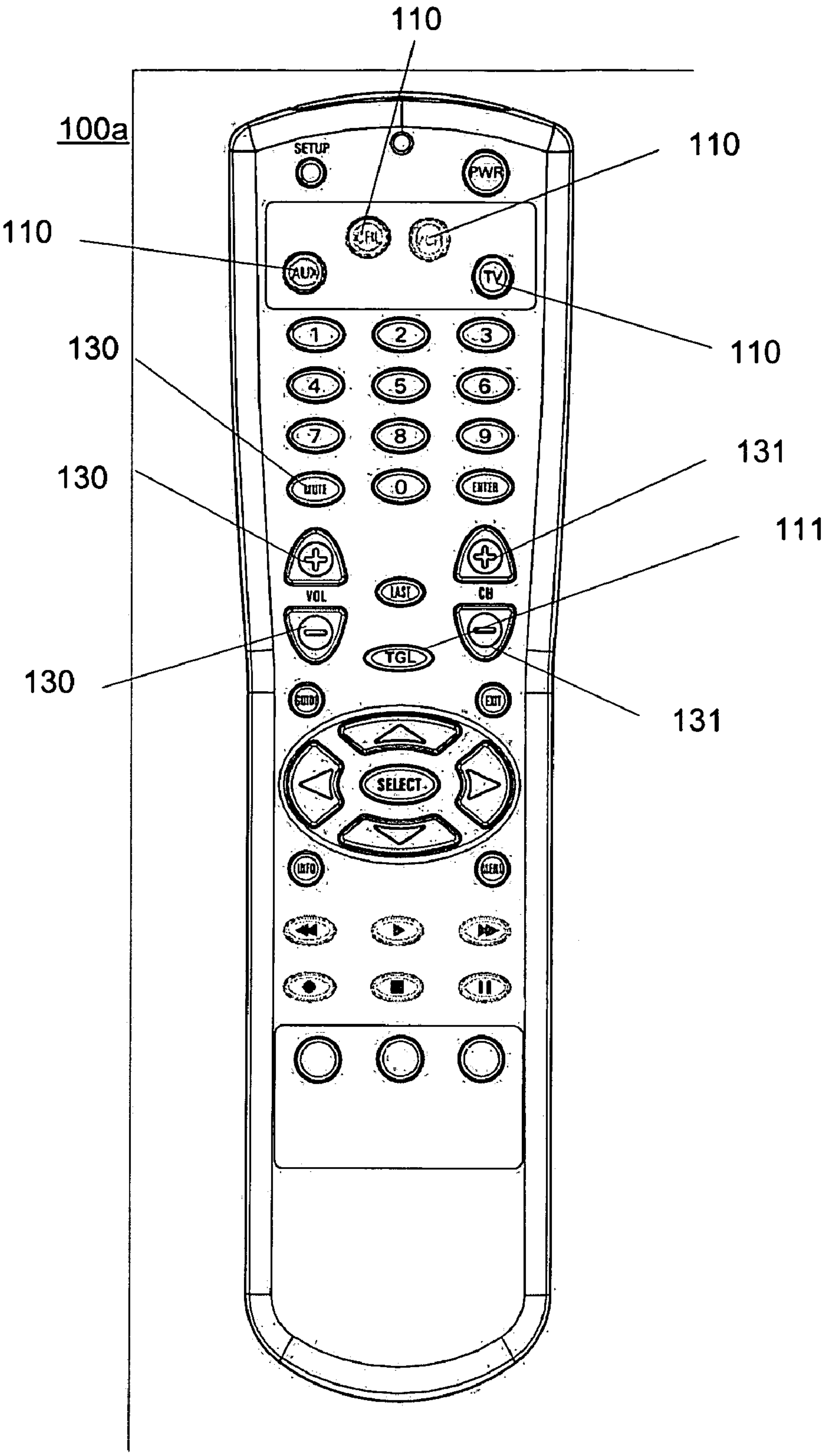
FIG. 3 illustrates an exemplary controlling device having illuminable, hard function keys.
Figure 6:
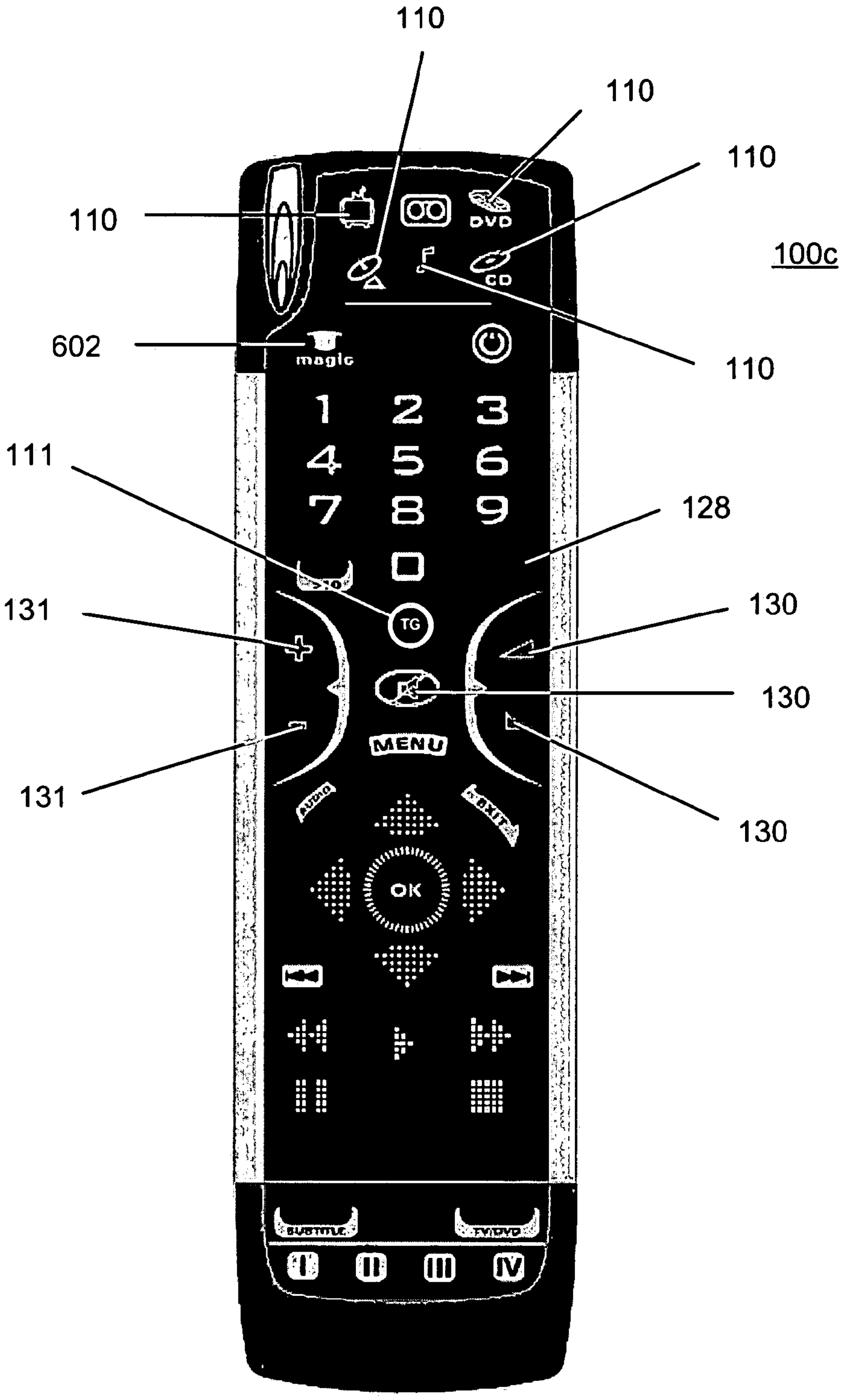
FIG. 6 illustrates an exemplary controlling device having an EL display.

For creating a correspondence between a command code and a function command key, data may be entered into the controlling device 100 that functions to identify an intended target appliances by its type and make (and sometimes model). Such data allows the controlling device 100 to transmit recognizable command codes in the format appropriate for such identified appliances. Typically, intended target appliances for function command key actuations are identified for each device mode state of the controlling device 100. By way of example, FIG. 3 illustrates a controlling device 100*a* having a "TV" device mode state, "AUX" device mode state, "VCR" device mode state, and "CBL" device mode state which are selectable through actuation of a corresponding device mode selection key 110—the device mode state to be entered upon actuation of a device mode selection key 110 being identified by a textual label supplied to the device mode keys 110. FIG. 6 illustrates a controlling device 100*c* wherein the device mode selection keys 110 have iconic labels. Since methods for setting up a controlling device to command the operation of specific home appliances are well-known, such methods need not be described in greater detail herein. Nevertheless, for additional information pertaining to setup procedures, the reader may turn to U.S. Pat. Nos. 4,959,810, 5,614,906, and 6,225,938. It will also be appreciated that the controlling device 100 may be set up to command an appliance 102, 104, 106, or 108 by being taught the command codes needed to command such appliance as described in U.S. Pat. No. 4,623,887. Still further, it will be understood that command codes may pre-stored in the controlling device 100 or the controlling device 100 may be upgradeable, for example via use of receiver 308.

Figures 4, 4A, 4B, 4C:
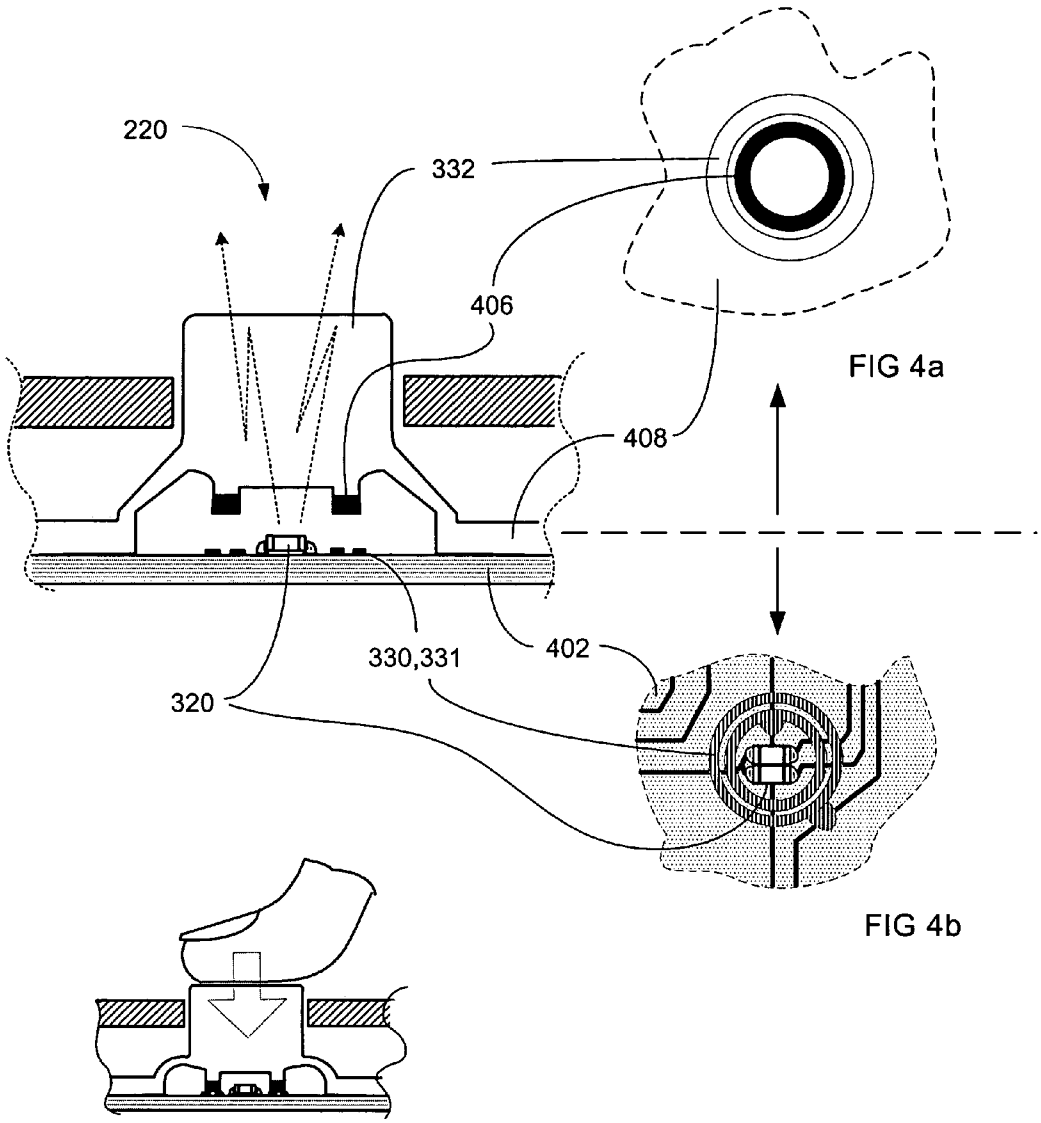
FIG. 4 illustrates a cross-sectional view of the hard function keys of the exemplary controlling device of FIG. 3.

Turning to FIG. 4, there is illustrated an exemplary mechanical construction of an illuminated key 220. For purposes that will be set forth hereinafter, the illuminated keys may be used to implement the device mode keys 110 of the controlling device 100*a* of FIG. 3. As is known in the art, a controlling device keypad typically comprises a silicon rubber sheet 408 with molded-in keys 332, in this case of translucent material at least in the area of the keycap(s) 332 which are to be illuminated. The underside of the key 332 is equipped with conductive carbon puck 406 in the shape of a ring. Key contact areas 331 and 332, comprising conductive ink silk-screened onto the printed circuit board 402 in the form of two concentric rings, are positioned directly below the conductive puck 406 such that the key matrix circuit 330, 331 is completed when key 332 is depressed as illustrated in FIG. 4*c*. A surface mount type LED 320 may be positioned directly below the center of the translucent key 332 such that the key may be illuminated from below when an LED is enabled by the microcontroller 300. In the illustrated case, a multi-colored LED comprising two individually-controllable junctions (e.g., two primary colored LEDs) is provided. With such a device, multiple colors are possible (e.g., the two primary colors and the secondary color for the combined primary colors) depending upon which LED junctions are enabled.

Figure 5:
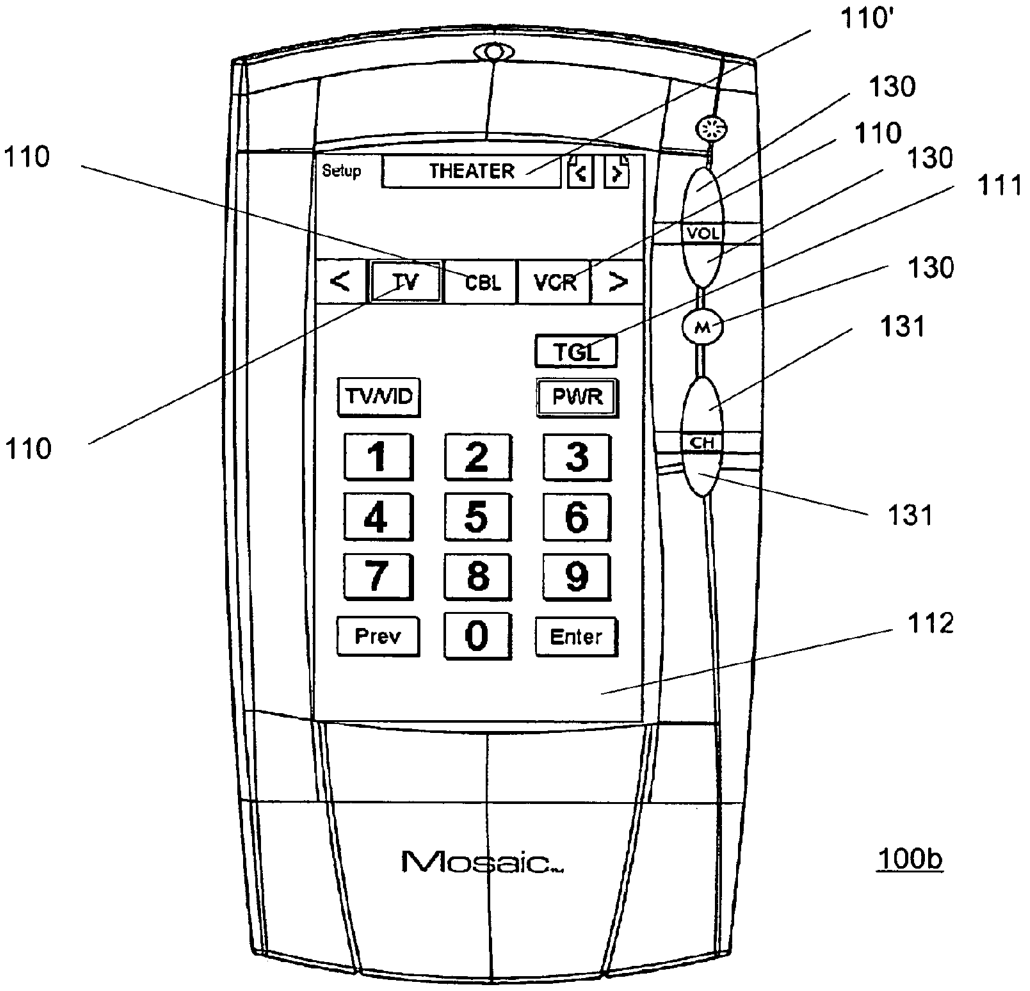
FIG. 5 illustrates an exemplary controlling device having a touch screen display.

By way of further example, FIG. 5 illustrates a controlling device 100*b* having a touch screen display 112. In this illustrated example, the display 112 comprises a touch screen that allows a user to interact with the controlling device 100*b* to, for example, setup the controlling device, select device mode states of the controlling device 100*b*, etc. In this regard, FIG. 5 shows device mode keys 110 in the form of soft keys presented on the touch screen display 112. As before, selecting a device mode key 110 places the controlling device 100*b* into a device mode state (e.g., TV, VCR, etc.). A further device mode key 110' is also illustrated for placing the controlling device 100*b* into a device mode state for commanding the operation of appliances in a "home theater," i.e., in a state for commanding the operation of multiple appliances within a home theater system. Additional examples of display-centric controlling devices are particularly described and illustrated in commonly owned U.S. application Ser. Nos. 09/905,423, 09/905,432, 09/405,396, 10/290,605, 10/288,727, and 10/344,020

By way of still further example, FIG. 6 illustrates a controlling device 100*c* which includes an electro-luminescent display 128. Unlike the controlling device 100*a* illustrated in FIG. 3, which includes silicon rubber keypads protruding through cut-outs in a hard plastic upper housing, the controlling device 100*c* uses a flexible, segmented electroluminescent ("EL") panel that is overlaid over a dome switch style key matrix. An example controlling device having such an EL panel is particularly illustrated and described in commonly owned U.S. application Ser. No. 10/410,103. Of particular note, the EL panel may be constructed to allow various parts of the display to be independently illuminated, using one or more colors, under control of the microprocessor 300 and an EL display interface.

As noted above, the controlling device 100 may be placed into a device mode state for commanding an operation of one or more appliances through actuation of a device mode key 110. The controlling device 100 may further include a device mode state toggle key 111 that is provided to toggle the controlling device 100 between various of the device mode states that are attainable via normal actuation of the device mode keys 110. It is to be appreciated that the controlling device 100 may be configured such that the controlling device 100 may be placed into various device mode states through use of either the device mode state toggle key 111 or the device mode keys 110. It is to be further appreciated that the controlling device 100 may be alternatively configured such that the device mode state toggle key 111 alone is used to place the controlling device into various device mode states. In this latter case, the device mode keys 110 may be provided simply to act as an actuatable means for specifying device mode states during a setup process and/or as a means for providing an indication of a current device mode state when the device mode state toggle key 111 is actuated. When provided for the sole purpose of providing device mode indicia information, the device mode keys 110 need not be in the form of actuatable elements, i.e., they need not be "keys." Rather, they may be in the simple form of one or more elements having an associated indicia, such as a label, color, blink pattern, LED, sound, haptic feedback such as vibration, or the like, which will be illuminated, displayed, or otherwise presented to the user for the purpose of specifying which device mode state is entered into in response to actuation of the device mode state toggle key 111. Accordingly, it will be further appreciated that the device mode state toggle key 111 can be utilized in connection with or in lieu of the device mode keys 110 when needed to specify a device mode state during setup operations.

Figure 7:
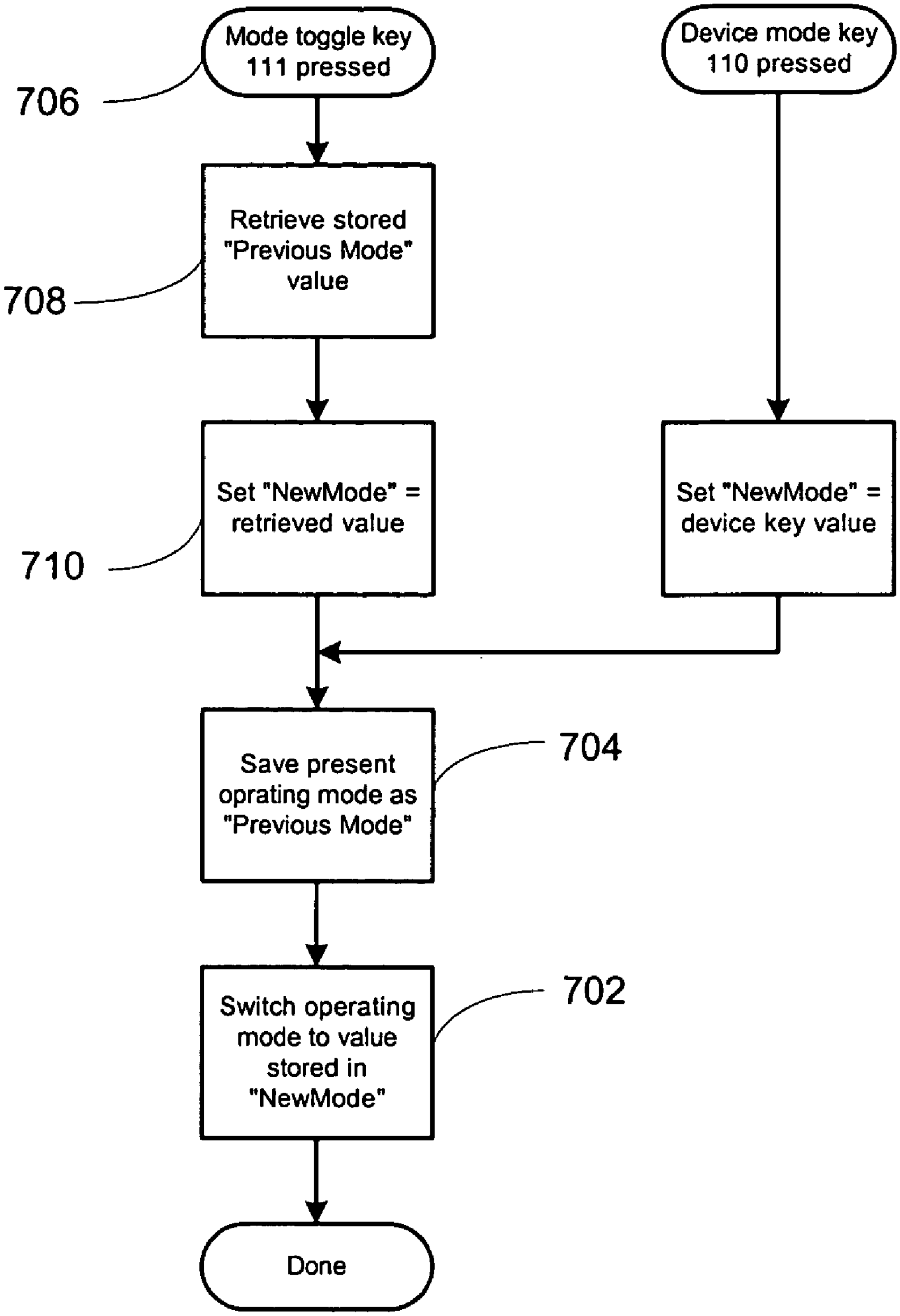
FIG. 7 illustrates an exemplary operational flowchart for changing device mode states via actuation of a device mode state toggle key.

Turning to FIG. 7 there is illustrated an example in which actuation of a device mode state toggle key 111 may cause the controlling device 100 to toggle back and forth between the two most recently used device modes as illustrated in the flowchart of FIG. 7. As seen in the various figures, the device mode state toggle key 111 may be conveniently located in a position in the key matrix that is amidst the function keys, i.e., in the vicinity of volume control keys 130 and channel control keys 131, as in the example illustrated, or in proximity to other frequently used keys such as for example a group of menu navigation keys. In keeping with the example illustrated in FIG. 7, any time the controlling device switches to a new device mode state at step 702 (regardless of whether the device mode change is the result of activation of the state toggle key 111 or of one of the device mode keys 110) the current device mode state is stored at step 704 (i.e., the mode it is exiting) as a "Previous Mode" state. When the device mode state toggle key 111 is subsequently activated at step 706, this Previous Mode state value is retrieved at step 708 and becomes the new target device mode state value at step 710. In this manner, repeated activations of the device mode state toggle key 111 may serve to switch the controlling device back and forth between the two most recently used device mode states. Thus, a user viewing a video tape may find it convenient to use the device mode state toggle key 111 to toggle back and forth between device mode states for commanding functions of the VCR 106 and audio system 108, respectively, in order to make adjustments during playback. Later, when watching a broadcast television program, the same user may find it convenient to use the device mode state toggle key 111 to toggle back and forth between device mode states for controlling functions of the TV 102 and STB 104, respectively. It will therefore be appreciated that the ability to toggle between device modes states are accommodated by the state toggle logic described above based on the user's current activities, i.e., without requiring any special user input or configuration.

Actuation of the device mode state toggle key 111 may further cause the controlling device to cycle through various device mode states, i.e., to sequentially assume each device mode state that is maintained within a circular list wherein the circular list may be comprised of, for example, all possible device mode states, all device mode states that have been setup within the controlling device 100, or the like. By way of example and with reference to the controlling device 100*a* illustrated in FIG. 3, repeated actuation of the device mode state toggle key 111 may cause the controlling device 100*a* to cycle through the device mode states such that the controlling device 100 is placed into the device mode states following the order: "AUX"→"CBL"→"VCR"→"TV"→returning to "AUX" to repeat the sequence. A device mode state being exited in this example may have been attained by a prior actuation of the device mode state toggle key 111 or by a prior actuation of one of the device mode keys 110. Alternatively, actuation of a device mode key 110 may not effect the manner by which actuation of the device mode state toggle key 111 cycles through the device mode states. In this instance, a pointer that is used to identify a device mode state in a list of device mode states need not be changed/updated in response to actuation of a device mode key 110 such that the pointer continues to point to the last device mode state attained as a result of actuating the device mode state toggle key 111. Subsequent actuation of the device mode state toggle key 111 may then move the pointer to the next device mode state in the list to configure the controlling device 100 to function in that next pointed to device mode state. While described in the context of a circular list, it will be appreciated that the device mode states may be sequentially selected in other manners, for example in a front to back to front manner illustrated as follows:

"AUX"→"CBL"→"VCR"→"TV"→"VCR"→"CBL"→
"AUX"→"CBL" . . .

To provide a degree of flexibility, a user may be provided with an opportunity to setup the controlling device 100 to specify which device mode states are to be included or excluded from the list of device mode states that are selectable by means of actuation of the device mode state toggle key 111. To this end, a setup process may be initiated, for example by actuating a "setup key" or the like and signifying a desire to enter into a state toggle key setup procedure, for example by entering a predetermined key sequence such as "9," "8," and "7." In a simple form, the setup procedure may allow a user to select which device mode states are to be included or excluded from the list of device mode states as it is to be traversed in response to actuation of the device mode state toggle key 111. Selection of device mode state may be made, for example, by actuating one or more of the device mode keys 110 during the setup process. In a further setup procedure, the user may not only select which device mode states are to be included in the list but may also specify the order in which device mode states are to be accessed in response to actuation of the device mode state toggle key 111, for example by actuating one or more of the device mode keys 110 in the desired toggle order.

Figure 8:
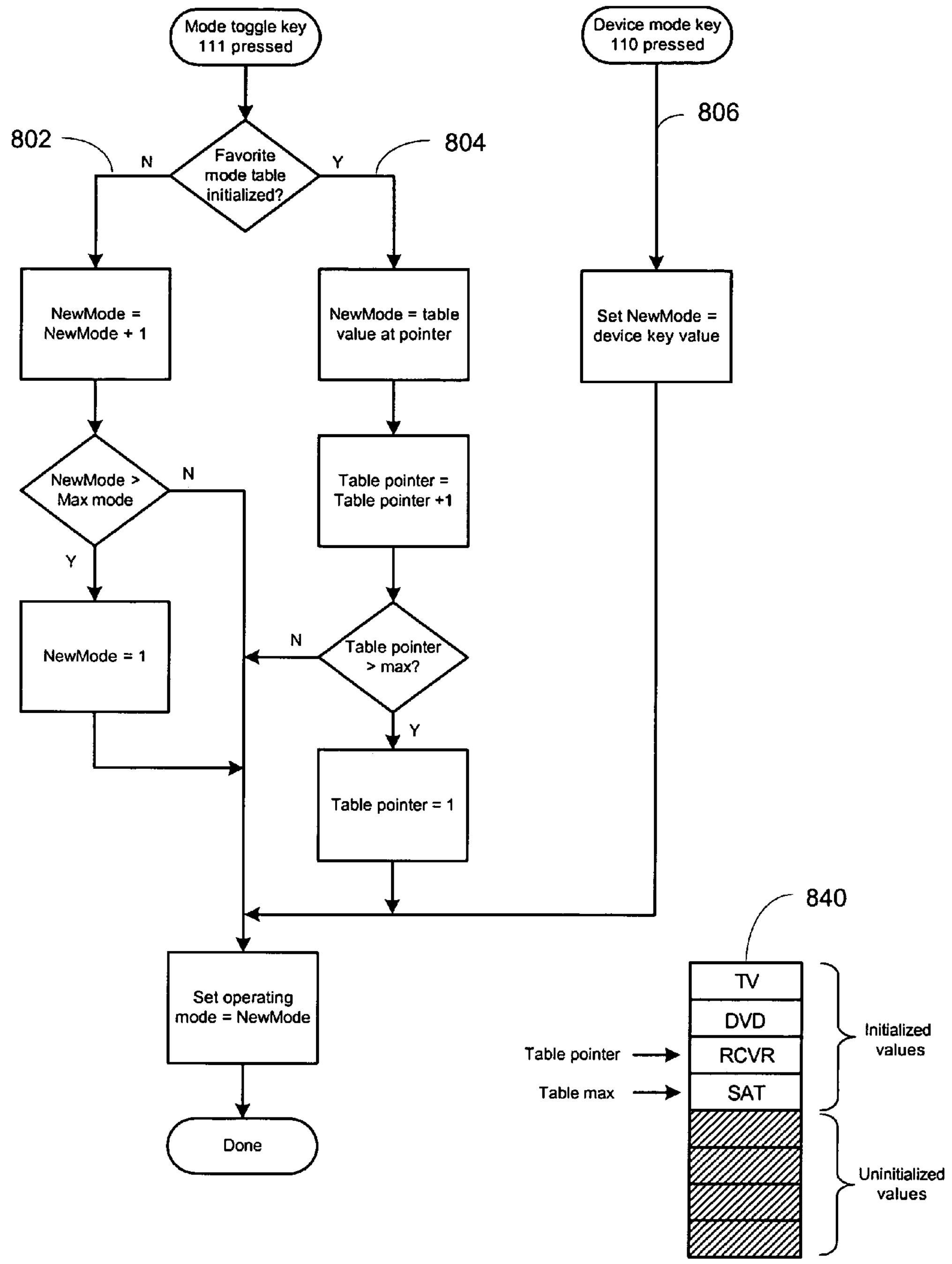
FIG. 8 illustrates an alternative exemplary operational flowchart for changing device mode states via actuation of a device mode state toggle key.

With reference to the controlling device 100*c* of FIG. 6 and the exemplary method illustrated in FIG. 8, once setup is complete, for example by the user again actuating the "setup key" 602, a device mode state list 840 may be stored for use in placing the controlling device 100*c* into one or more of the device mode states within the list 840 in response to actuation of the device mode state toggle key 111. In particular, in keeping with the example method illustrated in FIG. 8, actuation of the device mode state toggle key 111 may cause the controlling device to step linearly through all possible device mode states if the setup described above has not yet been performed (branch 802) or rotate through the user specified list of device mode states 840 (branch 804) if the above described user setup has been performed. Thus, when a device mode state table 840 is setup to include device mode states corresponding to a TV, a DVD, an audio receiver, and a satellite STB device, as illustrated by way of example in FIG. 8, successive actuations of the device mode state toggle key 111 will cause the controlling device to rotate through just these four device mode states in that order. Access to other device mode states, e.g. a CD device mode state, is still possible, however, through direct activation of the appropriate device mode key 110 as illustrated in branch 806.

In these manners, the user may conveniently setup the controlling device 100 such that actuation of the device mode state toggle key 111 will place the controlling device 100 into a desired device mode state, cause the controlling device 100 to toggle between multiple desired device mode states, or the like.

To inform a user as to which device mode state the controlling device 100 is placed into (whether in response to actuation of the device mode state toggle key 111 or a device mode key 110), the ability to independently illuminate various parts of the controlling device 100, with one or more colors, may be advantageously used. For example, a key illumination LED that is associated with a device mode key 110 may be illuminated (or the appropriate device mode key 100 otherwise provided with an appearance that is distinguishable from the other device mode keys 110) when the controlling device 100 is placed into the device mode state that is represented by that device mode key 110, e.g., an LED associated with the "AUX" device mode key 110 may be illuminated, changed colors, etc., to distinguish the "AUX" device mode key 110 from the remaining device mode keys 110 in response to direct actuation of the "AUX" device mode key and/or an actuation of the device mode state toggle key 111 that results in the controlling device 100 being placed into the device mode state corresponding to "AUX." Similarly, a label representative of a device mode state may be illuminated or otherwise made distinguishable from other labels when the controlling device 100 is placed into a device mode state that is represented by the label. In this regard, the label may be presented as text or an icon (or any graphical representation) in display 112, an illuminated EL segment, printed on an element overlaying an LED, printed on a label and positioned adjacent to an LED, or the like. Still further, a display device, whether comprised of an EL segment, touch screen image, one or more LEDs, etc., may be illuminated a color that is used to represent a device mode state when the controlling device 100 is placed into the device mode state represented by that color. Yet further, a pattern of sounds, LED blinks, etc. may be emitted from the controlling device 100 to indicate a current device mode state. In any of these instances, the identifier for a device mode state may be predefined or user-selectable. It will be understood that the device mode state identifier may also be constantly presented, temporarily presented (e.g., for a predetermined time after a device mode has been entered into, after a command key has been actuated, etc.), or presented in response to actuation of a predetermined key (e.g., in response to the user actuating a "show mode" key or the like). Indicia utilized to represent device modes may also be utilized to indicate a relationship between a function key and an intended target appliance for a command transmitted in response to activation of the function key as described in co-pending and commonly assigned U.S. application Ser. No. 10/664,629, entitled "CONTROLLING DEVICE USING VISUAL CUES TO INDICATE APPLIANCE AND FUNCTION KEY RELATIONSHIPS."

Figure 9:
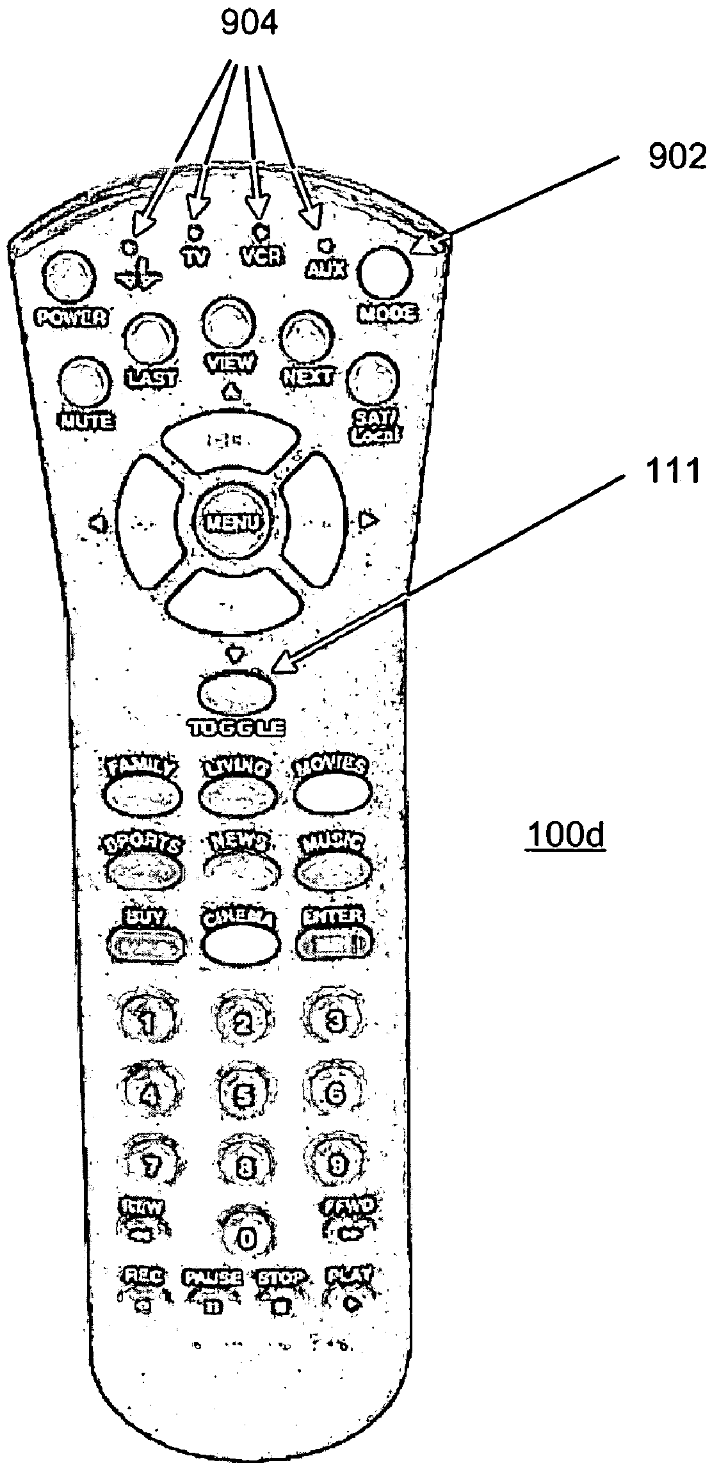
FIG. 9 illustrates an exemplary controlling device comprising a single key for sequentially selecting device modes, a separate device mode state toggle key, and illuminable indication of current mode setting.
Figure 10:
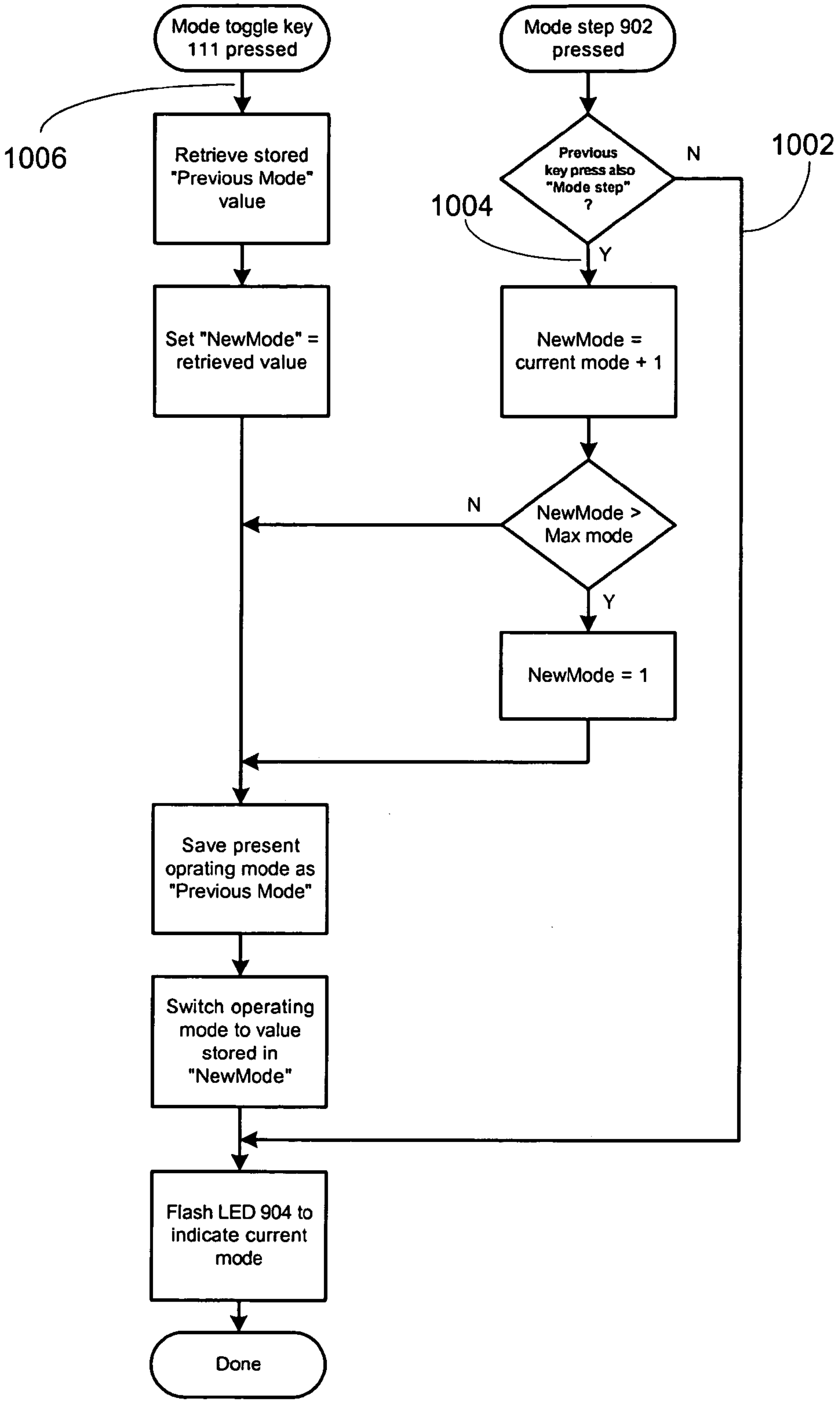
FIG. 10 illustrates another exemplary operational flowchart for a device mode state toggle key, suitable for use with the controlling device of FIG. 9.

By way of further example, FIGS. 9 and 10 illustrate an implementation of a state toggle key on a controlling device 100*d* which uses a single key to step through device modes states in the manner described earlier in conjunction with the prior art Primestar "PrimeFinder" brand remote control. In this case, controlling device 100*d* is provided with a mode step key 902 which is used to step sequentially through four possible device mode states. The device mode state currently selected is indicated by illumination of one of the four LEDs 904, corresponding to Satellite, TV, VCR, and AUX respectively. Remote control 100*d* is further provided with a device mode state toggle key 111 which operates to toggle back and forth between the two most recently accessed device mode states. Turning to FIG. 10, it can be seen that the first time the mode step key 902 is activated (branch 1002) this will serve only to indicate the current device mode state by flashing the appropriate LED 904. Thereafter, subsequent actuations of the mode step key 902 occurring without any other intervening activity (branch 1004) will rotate through the four possible device mode states shown by way of example only. Separately, actuation 1006 of the device mode state toggle key 111 thus serves in this example to switch back and forth between the two most recently accessed device mode states in a similar manner to that described earlier in conjunction with FIG. 7.

While various embodiments of a system and method for constructing a control device having a state toggle feature have been described in detail, it will be appreciated by those skilled in the art that various modifications and alternatives to those concepts could be developed in light of the overall teachings of the disclosure. For example, while described in the context of functional modules and illustrated using block diagram format and flowcharts, it is to be understood that, unless otherwise stated to the contrary, one or more of the described functions and/or features may be integrated in a single physical device and/or a software module in a software product, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of a programmer and system engineer, given the disclosure herein of the system attributes, functionality, and inter-relationship of the various functional modules in the system. As such, the particular concepts disclosed are meant to be illustrative only and not limiting as to the scope of the invention which is to be given the full breadth of the appended claims and any equivalents thereof.

All documents cited within this application for patent are hereby incorporated by reference in their entirety.

The invention claimed is:

1. A controlling device having a plurality of device mode states each of which is selectable to configure the controlling device to command operating functions of one or more of a plurality of different appliances defined for that device mode state, the controlling device comprising:

programming responsive to receipt of a first input for directly selecting one of the plurality of device mode states to thereby configure the controlling device; and programming responsive to receipt of a second input for selecting, as a function of at least one of a one of the plurality of device mode states the controlling device is in at a time the second input is received and a one of the plurality of device mode states the controlling device was placed into a last time the second input was received, one of a subset of the plurality of device mode states to thereby configure the controlling device.

2. The controlling device as recited in claim 1, wherein the second input comprises actuation of a device mode state toggle key of the controlling device.

3. The controlling device as recited in claim 1, wherein the subset of the plurality of device mode states is maintained in a table stored in a memory of the controlling device.

4. The controlling device as recited in claim 1, wherein the subset of the plurality of device mode states comprises one or more device mode states selected from the plurality of device mode states by a user.

5. The controlling device as recited in claim 4, wherein the subset of the plurality of device mode states is selected by a user interacting with the programming responsive to receipt of a second input.

6. The controlling device as recited in claim 1, wherein the first input comprises actuation of one of a plurality of device mode keys of the controlling device each of which corresponds to one of the plurality of device mode states.

7. The controlling device as recited in claim 1, wherein the first input comprises selection of a device mode state from a menu of the controlling device having entries corresponding to each of the plurality of device mode states.

8. The controlling device as recited in claim 1, wherein the programming responsive to receipt of a second input additionally causes each of the device mode states within the subset of the plurality of device mode states to be selected in a predefined order.

9. The controlling device as recited in claim 8, wherein the predefined order is user selectable.

10. The controlling device as recited in claim 1, wherein the plurality of device mode states comprises only those device mode states of the controlling device that have been setup to cause the controlling device to be configured to command the operation of one or more appliances.

11. The controlling device as recited in claim 1, wherein each of the plurality of device mode states has an indicia that is presented when that device mode state is selected.

12. The controlling device as recited in claim 11, wherein the indicia comprises a color.

13. The controlling device as recited in claim 11, wherein the indicia comprises an illuminated LED.

14. The controlling device as recited in claim 11, wherein the indicia comprises a graphical representation.

15. The controlling device as recited in claim 11, wherein the indicia comprises a sound.

16. The controlling device as recited in claim 11, wherein the indicia comprises a vibration.

17. The controlling device as recited in claim 11, wherein the first input comprises actuation of one of a plurality of device mode keys of the controlling device each of which corresponds to one of the plurality of device mode states and wherein the indicia is associated with the plurality of device mode keys.

18. The controlling device as recited in claim 17, wherein the indicia comprises a means for presenting a device mode key with an appearance that is distinguishable from the remaining plurality of device mode keys.

19. The controlling device as recited in claim 18, wherein the indicia comprises a device mode key being illuminated.

20. The controlling device as recited in claim 2, wherein the device mode state toggle key is spaced from a top of the controlling device.

21. The controlling device as recited in claim 20, wherein the device mode state toggle key is located in a position adjacent to volume function command keys and channel function command keys of the controlling device.

22. The controlling device as recited in claim 20, wherein the device mode state toggle key is located in a position adjacent to menu navigation command keys of the controlling device.

23. The controlling device as recited in claim 2, wherein actuation of the device mode state toggle key causes the controlling device to be placed into one of two alternating device mode states.

24. The controlling device as recited in claim 23, wherein the alternating device mode states comprise a current device mode state and a device mode state exited to enter the current device mode state.

25. A machine readable media having embedded processor executable instructions for use in a controlling device having a plurality of device mode states each of which may be selected to configure the controlling device to transmit command codes to one or more of a plurality of different appliances, the readable media having instructions for performing steps comprising:

accepting first input that functions to directly select one of the plurality of device mode states to thereby configure the controlling device; and accepting second input that functions to select, as a function of at least one of a one of the plurality of device mode states the controlling device is in at a time the second input is accepted and a one of the plurality of device mode states the controlling device was placed into a last time the second input was accepted, one of a subset of the plurality of device mode states to thereby configure the controlling device.

26. The readable media as recited in claim 25, wherein the second input comprises actuation of a device mode state toggle key of the controlling device.

27. The readable media as recited in claim 25, wherein the instructions store the subset of the plurality of device mode states in a table stored in a memory of the controlling device.

28. The readable media as recited in claim 25, wherein the instructions accept input whereby a user selects which of the plurality of device mode states to include within the subset of the plurality of device mode states.

29. The readable media as recited in claim 25, wherein the first input comprises actuation of a corresponding one of a plurality of device mode keys of the controlling device each of which corresponds to one of the plurality of device mode states.

30. The readable media as recited in claim 25, wherein the first input comprises selections from a graphical user interface menu of the controlling device having entries corresponding to each of the plurality of device mode states.

31. The readable media as recited in claim 25, wherein the instructions additionally cause one of the subset of the plurality of device mode states to be selected in a predefined order.

32. The readable media as recited in claim 31, wherein the predefined order is user selectable.

33. The readable media as recited in claim 25, wherein the plurality of device mode states comprises only those device mode states of the controlling device that have been setup to cause the controlling device to be configured to command the operation of one or more appliances.

34. The readable media as recited in claim 25, wherein the instructions present an indicia representative of a device mode state when that device mode state is selected.

35. The readable media as recited in claim 34, wherein the indicia comprises a color.

36. The readable media as recited in claim 34, wherein the indicia comprises an illuminated LED.

37. The readable media as recited in claim 34, wherein the indicia comprises a graphical representation.

38. The readable media as recited in claim 34, wherein the indicia comprises a sound.

39. The readable media as recited in claim 34, wherein the indicia comprises a vibration.

40. The readable media as recited in claim 34, wherein the first input comprises actuation of one of a plurality of device mode keys of the controlling device each of which corresponds to one of the plurality of device mode states and wherein the indicia is associated with the plurality of device mode keys.

41. The readable media as recited in claim 40, wherein the indicia comprises a means for presenting a device mode key with an appearance that is distinguishable from the remaining plurality of device mode keys.

42. The readable media as recited in claim 41, wherein the indicia comprises a device mode key being illuminated.

43. The readable media as recited in claim 26, wherein actuation of the device mode state toggle key causes the instructions to place the controlling device into one of two alternating device mode states.

44. The readable media as recited in claim 43, wherein the alternating device mode states comprise a current device mode state and a device mode state exited to enter a current device mode state.

45. For use in a controlling device having a plurality of device mode states each of which may be selected to configure the controlling device to transmit command codes to one or more of a plurality of different appliances, a method comprising:

receiving input for causing the controlling device to change from a first device mode state selected from the plurality of device mode states to a second device mode state selected from the plurality of device mode states; and in response to the input being received placing the controlling device into the second device mode state; and storing data indicative of the first device mode state in the controlling device whereby the stored data is used by the controlling device in connection with an actuation of a device mode state toggle key of the controlling device to return the controlling device to the first device mode state.

46. The method as recited in claim 45, wherein the input comprises actuation of the device mode state toggle key.

47. The method as recited in claim 45, wherein the input comprises actuation of one of a plurality of device mode keys of the controlling device each representing one of the plurality of device mode states.

48. The method as recited in claim 47, comprising illuminating the device mode key representing the second device mode state.

49. For use in a controlling device having a plurality of device mode states each of which may be selected to configure the controlling device to transmit command codes to one or more of a plurality of different appliances, a method comprising:

receiving input for selecting a subset of the plurality of device mode states to create a circular list of device mode states which is stored in a memory of the controlling device such that input received from a single device mode state toggle key will cause the controlling device to change from a current device mode state selected from the subset of the plurality of device mode states into another device mode state selected from the subset of the plurality of device mode states where the another device mode state follows the current device mode state within the circular list of device mode states stored in the memory and wherein, in response to the change, the another device mode state becomes the current device mode state.

* * * * *